US007739045B2

(12) United States Patent
Thompson, Jr. et al.

(10) Patent No.: US 7,739,045 B2
(45) Date of Patent: Jun. 15, 2010

(54) RAPID SELF-ALIGNMENT OF A STRAPDOWN INERTIAL SYSTEM THROUGH REAL-TIME REPROCESSING

(75) Inventors: I. Clay Thompson, Jr., Tampa, FL (US); Kenneth S. Morgan, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 1050 days.

(21) Appl. No.: 11/421,347

(22) Filed: May 31, 2006

(65) Prior Publication Data

US 2007/0282529 A1   Dec. 6, 2007

(51) Int. Cl.
*G01C 23/00* (2006.01)
(52) U.S. Cl. .......................... 701/220; 701/200; 701/3; 701/224; 701/214; 342/357.14; 342/357.04
(58) Field of Classification Search ................. 701/200, 701/220, 3, 207, 214, 221, 224, 225; 342/357.04, 342/357.14
See application file for complete search history.

(56) References Cited

U.S. PATENT DOCUMENTS

| 4,303,978 | A | * | 12/1981 | Shaw et al. ................. 701/220 |
| 5,654,890 | A | * | 8/1997 | Nicosia et al. ................ 701/16 |
| 5,657,025 | A | * | 8/1997 | Ebner et al. ................. 701/300 |
| 5,787,384 | A | * | 7/1998 | Johnson ...................... 701/216 |
| 5,835,060 | A | * | 11/1998 | Czarnecki et al. ........... 342/442 |
| 5,991,691 | A | * | 11/1999 | Johnson ...................... 701/214 |
| 6,157,891 | A | * | 12/2000 | Lin ............................. 701/301 |
| 6,167,347 | A | * | 12/2000 | Lin ............................. 701/214 |
| 6,205,400 | B1 | * | 3/2001 | Lin ............................. 701/214 |

(Continued)

FOREIGN PATENT DOCUMENTS

EP   1059509 A1   12/2000

(Continued)

OTHER PUBLICATIONS

Chuanbin et al., "A Novel Method Imrpoving The Alignment Accuracy of a Strapdown Inertial Navigation System on a Stationary Base", "Measurement Science And Technology", 2004, pp. 765-769, vol. 15, Publisher: Institute of Physics Publishing, Published: UK.

(Continued)

*Primary Examiner*—Thomas G Black
*Assistant Examiner*—Wae Louie
(74) *Attorney, Agent, or Firm*—Fogg & Powers LLC

(57) ABSTRACT

A method of aligning an inertial navigation system or gyrocompass, including executing real-time navigation software on real-time inertial data to generate real-time navigation data, executing real-time Kalman filter software on the real-time navigation data and real-time aiding data, recording the real-time inertial data and the real-time aiding data as real-time input data in a buffer, initializing a playback process, executing playback navigation software on buffered inertial data to generate playback navigation data, and executing playback Kalman filter software on the playback navigation data and buffered aiding data. The execution of the real-time navigation software and the real-time Kalman filter software effect a real-time alignment process. The playback navigation software and the playback Kalman filter software effect an alignment process executed at a faster rate than the real-time navigation software and real-time Kalman filter software.

20 Claims, 7 Drawing Sheets

U.S. PATENT DOCUMENTS

| | | | |
|---|---|---|---|
| 6,317,683 B1* | 11/2001 | Ciprian et al. | 701/118 |
| 6,487,500 B2* | 11/2002 | Lemelson et al. | 701/301 |
| 6,512,976 B1* | 1/2003 | Sabatino et al. | 701/207 |
| 6,522,266 B1* | 2/2003 | Soehren et al. | 340/988 |
| 6,630,904 B2* | 10/2003 | Gustafson et al. | 342/357.06 |
| 6,631,323 B2* | 10/2003 | Tucker et al. | 701/221 |
| 6,697,736 B2* | 2/2004 | Lin | 701/214 |
| 6,779,752 B1* | 8/2004 | Ratkovic | 244/3.15 |
| 6,792,363 B1* | 9/2004 | Bye | 702/57 |
| 6,865,477 B2* | 3/2005 | Nicosia et al. | 701/207 |
| 6,883,747 B2* | 4/2005 | Ratkovic et al. | 244/3.15 |
| 7,512,493 B2* | 3/2009 | Morgan et al. | 701/214 |
| 2002/0120400 A1* | 8/2002 | Lin | 701/214 |
| 2004/0148093 A1 | 7/2004 | Tanaka et al. | |
| 2006/0047427 A1 | 3/2006 | Weed et al. | |
| 2007/0282529 A1* | 12/2007 | Thompson et al. | 701/220 |

FOREIGN PATENT DOCUMENTS

| | | |
|---|---|---|
| EP | 1760431 | 3/2007 |
| GB | 2351808 A | 1/2001 |

OTHER PUBLICATIONS

Gao et al., "Application of Nonlineear Filtering For Sins Initial Alignment", "Proceddings of the 2006 IEEE International Conferene on Mechatronics and Automation", 2006, pp. 2259-2263, Publisher: IEEE.

Rogers, "IMU In-Motion Alignment Without Benefit Of Attitude Initialization", "Navigation and Positioning in the Information Age", Jan. 14-16, 1997, pp. 945-954, Publisher: ION 1997 National Technical Meeting.

Tuan Manh Pham, Kalman filter mechanization for INS airstart, IEEE, Oct. 14, 1991, pp. 516-525.

* cited by examiner

RAPID SELF-ALIGNMENT OF A STRAPDOWN INERTIAL SYSTEM THROUGH REAL-TIME REPROCESSING

CROSS REFERENCE TO RELATED APPLICATIONS

This application is related to U.S. patent application Ser. No. 11/421,337, having a title of "HIGH SPEED GYRO-COMPASS ALIGNMENT VIA MULTIPLE KALMAN FILTER BASED HYPOTHESIS TESTING filed on the same date herewith. The Application is incorporated herein by reference.

BACKGROUND

A strapdown inertial navigation unit contains inertial sensors (gyros and accelerometers) fixed within an inertial measurement unit (IMU). Because the sensors are fixed to the IMU chassis ("strapped down"), the angular relationship of their input axes to chosen IMU axes is constant, so rotations and accelerations measured by the sensors can be used to compute equivalent rotations and accelerations along IMU axes. Typically the IMU is fixed to the body of a host vehicle to be navigated, such as an aircraft or land vehicle, but it can be a free-standing unit carried by an individual.

For the unit to navigate accurately, the IMU's initial attitude, that is the IMU's angular orientation with respect to some chosen navigation reference frame, must be determined through an alignment procedure. (By long tradition the procedure is called "alignment", even if, as in most strapdown systems, there is no actual repositioning of the unit. For such systems the "alignment" or more properly "self-alignment" procedure involves only the collection and processing of data from the inertial sensors and other data supplied by the user or obtained from other sensors.)

Specifically, the alignment procedure determines the directions of the orthogonal axes of the IMU with respect to a selected navigation reference frame. An oft-used reference frame is defined by vectors that point north, east and down at the IMU's location. The angular relationship between the IMU axes and the navigation reference frame is defined by the values of a selected set of attitude parameters. Several such sets are in common use. But whatever set is selected, the purpose of the alignment procedure is to develop numeric values for the parameters that constitute that set. For subsequent inertial navigation to be accurate, these values must be determined accurately.

When heading of the vehicle is unspecified, the alignment procedure is executed in two phases. The first phase, coarse alignment, determines heading to within, say, a few degrees, after which the second phase, fine alignment, is started. Fine alignment further refines the heading error, and also solves for various inertial sensor errors. The two phases are necessary because of the limitations of alignment algorithms that approximate the equations that govern the inertial system with linearized forms; this includes Kalman filters and most other alignment algorithms. The underlying assumption for such algorithms is that, for the ranges of the errors being estimated, the governing equations of the inertial system are well approximated by a linearization about a known approximate solution. But this assumption is not justified for an unspecified heading; the actual heading can differ as much as 180 degrees from an assumed heading, and the governing equations involve sines and cosines of heading, which are far from linear over this wide range. For such large initial errors, the ignored non-linearities in the governing equations limit the accuracy of the coarse alignment algorithm, corrupting not only the estimate of heading but also the estimates of other quantities such as inertial sensor errors. The fine alignment algorithm, on the other hand, can separate a richer selection of alignment and inertial sensor errors, and can do it more accurately, but only when all the initial errors are sufficiently small. So coarse alignment is undertaken first, to reduce the errors to sizes that fine alignment can accommodate.

Both coarse alignment and fine alignment operate on inertial data supplied at regular intervals by the inertial sensors, and on "observation data" from some external source. As defined herein, input data comprises the inertial data and the observation data. Observation data may be measurements by one or more aiding sensors such as a GPS receiver, or can be information supplied by the user, such as the fact that the vehicle is stationary. A common alignment approach is to initialize the inertial navigation system with externally-supplied or default values for the navigation variables and allow it to navigate. The resulting navigation data are used to predict the data for an external observation; then these predicted observation data are compared with the actual observation data. A Kalman filter algorithm uses the differences in the observation data and estimates of the probability distributions of navigation errors to estimate the navigation errors; the error estimates are applied as corrections to the navigation data. The process is repeated at regular intervals.

Coarse alignment begins by determining the attitude with respect to the local level plane and using the outputs of accelerometers as they sense the effect of gravity. Because gravity is so much larger than the accelerometer errors, under stationary conditions an accurate determination is made quickly, typically in a few seconds. In contrast, the determination of heading requires that the rotation of the earth be sensed by gyros. Earth rate is larger than the gyro errors, but slow enough that typically it takes on the order of a minute to determine heading to within a few degrees. Finally, fine alignment takes a few minutes more to reduce the heading error to a small fraction of a degree and to accurately estimate other system errors, such as those for inertial sensors. In total, for vehicles stationary with respect to the earth, the complete alignment procedure can take several minutes. For situations in which alignment must be performed with aiding data of lesser accuracy (e.g., airborne Doppler radar), or while the system is experiencing vigorous dynamics (e.g., aboard ship in heavy seas), accurate alignment can take significantly longer.

Many operators of vehicles with inertial navigators want to prepare their vehicles for takeoff within a very short time. In military, medical and law enforcement applications, the time spent sitting on the runway while the inertial navigation unit completes its alignment procedure is lost time that can be critical to the safety of soldiers and/or citizens.

For short alignment times, there's a trade-off between alignment time and alignment accuracy. Within limits, a longer alignment time leads to better alignment accuracy and therefore to improved accuracy in the subsequent navigation. How this trade is resolved depends on the application, and in some applications on decisions made by the user. For example, in an urgent situation, a pilot may elect to cut alignment time short, and accept the resulting degradation in navigation accuracy. Any improvement that allows the same accuracy to be achieved in less alignment time may also provide improved accuracy with the same alignment time, or may provide some combination of improved alignment time and improved accuracy.

SUMMARY

One aspect of the present invention provides a method including executing real-time navigation software on real-time inertial data to generate real-time navigation data, executing real-time Kalman filter software on the real-time navigation data and real-time aiding data, recording the real-time inertial data and the real-time aiding data as real-time input data in a buffer, initializing a playback process, executing playback navigation software on buffered inertial data to generate playback navigation data and executing playback Kalman filter software on the playback navigation data and buffered aiding data. The execution of the real-time navigation software and the execution of the real-time Kalman filter software effect a real-time alignment process. The playback navigation software and the playback Kalman filter software are executed at a faster rate than the real-time navigation software and real-time Kalman filter software.

Another aspect of the present invention provides an inertial navigation unit including at least one sensor to provide real-time input data, a programmable navigation processor communicatively coupled to the at least one sensor, real-time navigation software, real-time Kalman filter software, playback navigation software, and playback Kalman filter software. The real-time navigation software is executable by the programmable navigation processor. The real-time navigation software generates a real-time navigation solution at a first tasking rate based in part on the real-time input data. The real-time Kalman filter software is executable by the programmable navigation processor. The real-time Kalman filter software processes the real-time input data at a second tasking rate. The playback navigation software is executable by the programmable navigation processor after a selected time. The playback navigation software generates a playback navigation solution at a rate faster than the first tasking rate. The generation of the playback navigation solution is based in part on buffered input data. The playback Kalman filter software is executable by the programmable navigation processor after the selected time. The playback Kalman filter software processes the buffered input data at a rate faster than the second tasking rate. The first tasking rate is higher than the second tasking rate.

Yet another aspect of the present invention provides a program-product comprising program instructions, embodied on a storage medium, that cause a programmable processor to execute real-time navigation software on real-time inertial data to generate real-time navigation data, execute real-time Kalman filter software on the real-time navigation data and real-time aiding data, record the real-time inertial data and the real-time aiding data as real-time input data in a buffer, initialize the playback navigation software with a playback initial attitude estimate estimated from the real-time alignment process, initialize the playback Kalman filter software with states and covariances appropriate for the playback initial attitude estimate, execute playback navigation software on buffered inertial data to generate playback navigation data and execute playback Kalman filter software on the playback navigation data and buffered aiding data.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1A:
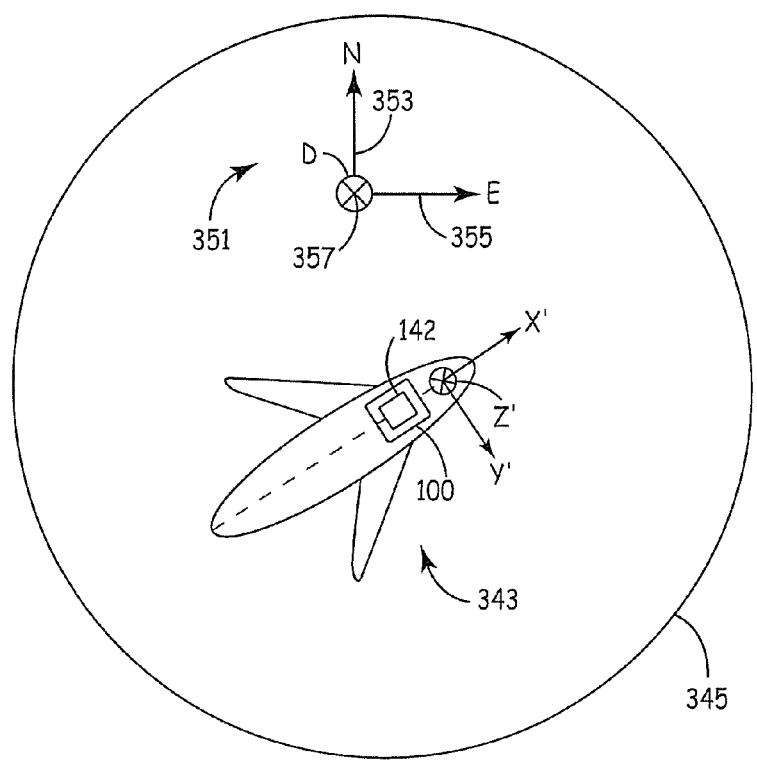
FIG. 1A is a diagram illustrating an inertial navigation unit on a vehicle with respect to a reference frame.

This disclosure presents a method for initial self-alignment of a strapdown inertial system that reduces the time required to achieve a given level of accuracy. The self-alignment process advances sequentially through leveling, coarse alignment and fine alignment phases. The "playback" method disclosed here saves nearly all of the time expended in the leveling and coarse align phases, and under most circumstances also improves the accuracy of the fine alignment phase.

The method makes use of two alignment processes that overlap in time, a "real-time" process and a "playback" process. Both processes use navigation software that processes inertial measurements to keep track of navigation variables such as earth location, velocity and attitude; and both use a Kalman filter that processes externally-supplied observation data to generate corrections to the navigation variables.

The real-time navigation software and Kalman filter perform leveling and coarse alignment before advancing into fine alignment. As they do so, they record both the inertial data and the observation data in a buffer to form buffered input data. Thus, the buffered input data comprises the buffered inertial data and the buffered observation data. The real-time navigation also integrates gyro data in an on-going calculation of the attitude change with respect to inertial coordinates, and the real-time Kalman filter computes a running sum of squares of the observation residuals.

At a selected time after the real-time process has advanced to fine alignment, the strapdown inertial system uses its current estimated attitude with respect to local vertical, the location change since the beginning of alignment, the attitude change with respect to inertial coordinates and the elapsed time since the beginning of alignment to compute an estimated attitude at the beginning of alignment. The playback navigation software is initialized with the estimated attitude; otherwise its initialization is the same as that for real-time navigation. The playback Kalman filter is initialized with attitude covariance appropriate for the estimated attitude; otherwise its initialization is the same as that for the real-time Kalman filter. This initialization enables the playback processing.

Playback processing operates on the same data as real-time processing, because playback processing operates on the buffered input data retrieved from the buffer. But results generated during playback processing differ from the results generated during real-time processing, because the initializations differed and because playback uses only the fine alignment algorithm. While the playback processing is ongoing, the real-time processing continues to execute the currently measured inertial data and observation data and continues to store the currently measured inertial data and observation data in the buffer. But playback processing executes at a higher rate than real-time processing, so ultimately playback processing catches up to real-time processing, in the sense that the only buffered data left for playback processing is the latest set of buffered input data that real-time processing has just recorded in the buffer. At this time, the buffered input data being processed in playback is the currently measured inertial data and observation data that is also being processed real-time. Then and thereafter, both the real-time processing and the playback processing are producing real-time navigation solutions, but the playback processing is more accurate because playback has processed all the data with the fine align algorithm.

A method is described here that replaces the real-time navigation and filter variables with their playback counterparts, while preserving the timing of real-time outputs to the user. Also disclosed here is a method of setting the playback observation variance in accordance with scatter in the real-time observation residuals. For fixed-location alignment under any but worst-case disturbances, this can improve the accuracy of playback alignment. Individually or in combination, the methods disclosed allow the same accuracy to be achieved in less alignment time, and/or provide improved accuracy for the same alignment time.

FIG. 1A is a diagram illustrating an exemplary strapdown inertial navigation unit 100 installed in a fixed orientation within a host vehicle 343. Within the inertial navigation unit 100 is an inertial measuring unit (IMU) 142 containing inertial sensors which measure components of angular rate and sensed acceleration. The measured angular rates and accelerations are used to compute the equivalent angular rates and sensed accelerations along a set of orthogonal IMU axes X', Y', Z' that constitute the IMU reference frame. (For clarity the figure does not distinguish between the reference frames for the inertial navigation unit 100, the IMU 142, and the host vehicle 343, but in practice the three can differ; when this is the case the invention disclosed herein still applies.) For accurate inertial navigation after departure, the attitude (angular orientation) of the IMU axes X', Y', Z' with respect to some selected navigation reference frame 351 must be determined accurately beforehand by a procedure called "initial alignment". In FIG. 1A the exemplary navigation reference frame 351 is comprised of the orthogonal axes N 353, E 355, and D 357 which point respectively north, east and down at the location of the IMU 142. Since the navigation reference frame axes N 353 and E 355 are orthogonal to axis D 357, which points down, axes N 353 and E 355 are necessarily level. Therefore, the reference frame comprising axes N 353 and E 355 is often called a local-level frame.

As used here the term "alignment" does not imply repositioning of any kind, neither translation nor angular reorientation. Instead, it is a procedure in which inertial sensor data and external aiding data are processed to determine the values of certain attitude parameters that define the attitude of the IMU 142 with respect to the navigation reference frame 351. For example, one can imagine a hypothetical IMU initially oriented with its orthogonal axes X, Y, Z parallel to the north, east, down directions respectively, and then rotated about its Z, Y and X axes (sequentially, and in that order) through heading, pitch and roll angles respectively, to arrive at the real IMU's attitude. Then heading, pitch and roll are the attitude parameters, and their numeric values define the attitude of the real IMU 142. Note that the real IMU 142 has not necessarily experienced these particular rotations; their rotation angles are just a way of describing its present attitude.

Attitude Heading and Reference Systems (AHRS) are instruments that typically do not navigate, but do use gyros and in some cases accelerometers to determine aircraft heading, pitch and roll. Also, some instruments use one or more gyros to sense earth rate for "north-finding" and their operation is sometimes referred to as "gyrocompassing." As used herein, the term "alignment" includes the concept of "gyrocompassing" and is meant to include the procedures and operation of all such instruments, and the invention herein disclosed is intended for use in all such instruments.

Figure 1B:
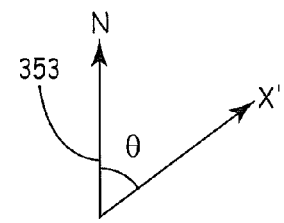
FIG. 1B is a diagram illustrating the heading of the vehicle shown in FIG. 1A.

In FIG. 1A the most obvious aspect of the IMU attitude (and therefore of the aircraft attitude) is the heading; FIG. 1B shows heading angle $\theta$ to be about 50 degrees. Not visible in the figure but still important is the fact that IMU axes X' and Y' may not be locally level. It takes three variables to completely describe the attitude; in this case heading, pitch and roll.

Heading, pitch and roll is a set of attitude parameters popular with pilots, but this set has defects which can be troublesome for the computations carried out in inertial navigators, so most systems employ an alternative way of representing attitude such as an attitude quaternion or an attitude direction cosine matrix, both of which represent the rotation of the three-axis IMU frame with respect to a three-axis local-level navigation frame. However the invention disclosed herein applies for any set selected.

Figure 2:
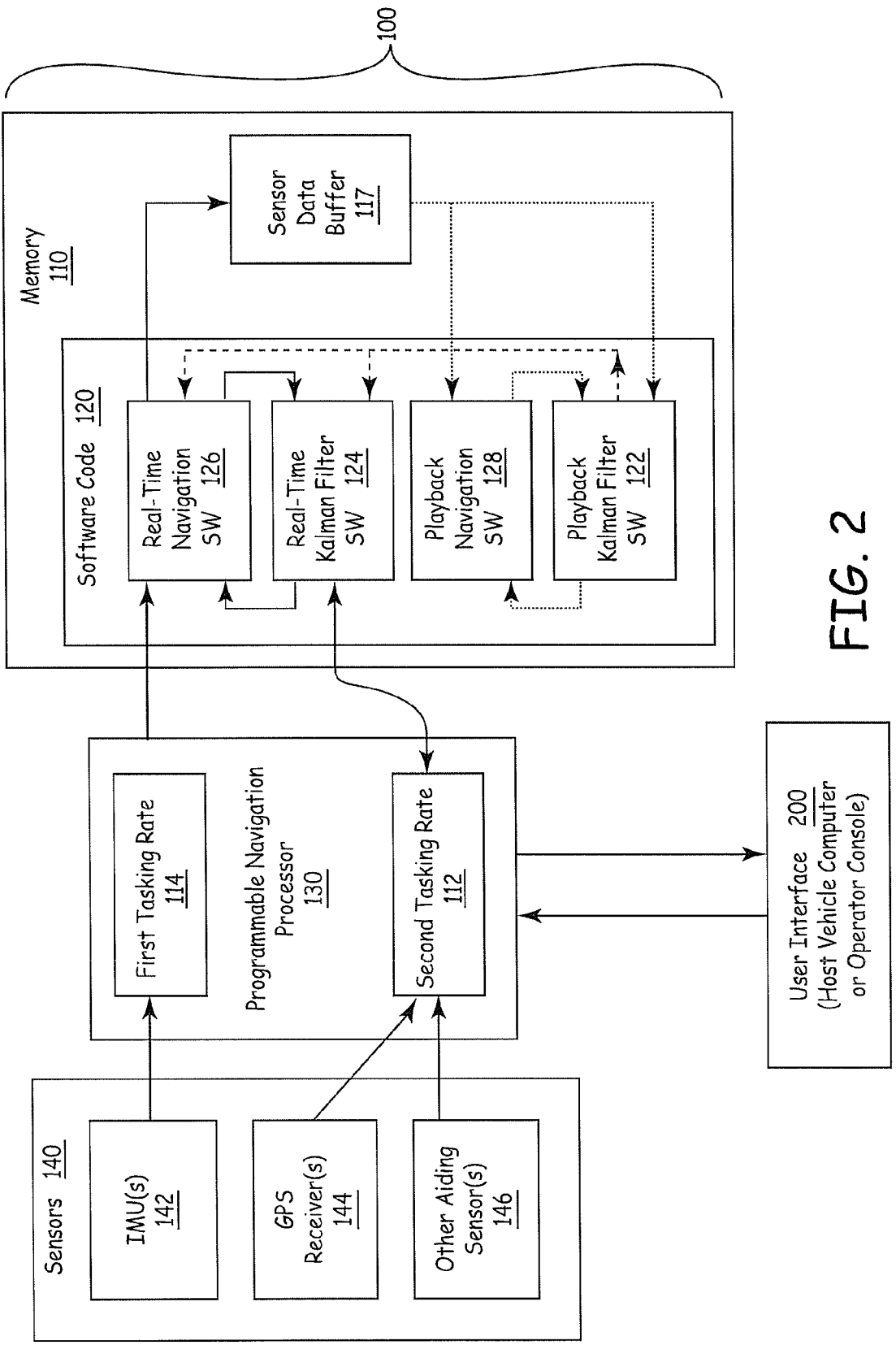
FIG. 2 is a block diagram of an embodiment of an inertial navigation unit.

FIG. 2 is a block diagram of an embodiment of the inertial navigation unit 100. Typically the inertial navigation unit 100 is implemented as a navigation system mounted to a vehicle, such as an air-based vehicle, a land-based vehicle or a water-based vehicle, but it could be a stand-alone unit carried by an individual person. The inertial navigation unit 100 comprises one or more sensors 140, one or more programmable navigation processors 130, and one or more memories 110 comprised of software code 120 and a sensor data buffer 117 (also referred to here as "buffer 117"). The software code 120 is also referred to as "software 120."

The programmable navigation processor 130 supports, at a minimum, two tasking rates, including first tasking rate 114 and second tasking rate 112. The sensors 140 include one or more inertial measurement units (IMU) 142, and may include one or more global positioning systems (GPS) receivers 144, and/or other aiding sensors 146. The IMU 142 are also referred to here as "inertial sensors 142."

The one or more sensors 140 are communicatively coupled to the programmable navigation processor 130. The one or more sensors 140 output data (for example, in analog or digital form) that are the consequence of one or more kinematic attributes (location, velocity, angular orientation) of the inertial navigation unit 100. This data is referred to herein as "input data" or "real-time input data." The one or more sensors 140 are comprised of two types; inertial sensors and aiding sensors. The inertial sensors provide real-time inertial data (also referred to as inertial data) to programmable navigation processor 130. The real-time navigation data generated by the real-time navigation software 126 comprises observation data including information indicative of accelerations, angular rates, integrals of the accelerations, and integrals of the angular rates. When present, the GPS receivers 144 are aiding sensors that provide location and related data to programmable navigation processor 130. When present, the other aiding sensors 146 provide other aiding data (also referred to as real-time aiding data or "observation data") to programmable navigation processor 130. Communications between sensors 140 and the programmable navigation processor 130 are via connections such as an RS422, 1553 or other electrical data bus, an Aeronautical Radio Incorporated (ARINC) data bus, a fiber optic data bus or a radio link. Other corrections are possible.

In an exemplary implementation of one embodiment, the inertial sensors 142 are three gyroscopes ("gyros") and three accelerometers. Each gyro is an inertial sensor 142 that senses angular rate (or its integral, angular change) about the gyroscope's input axis. Each accelerometer is an inertial sensor 142 that senses the component of linear acceleration (or its integral, a change in linear velocity) along the accelerometer's input axis. In this exemplary implementation, the three gyros are oriented with their input axes along three mutually orthogonal axes (in this case, the X', Y', Z' axes of FIG. 1A) and the three accelerometers are oriented with their input axes along the same IMU axes X', Y', Z'. The outputs of the gyros and accelerometers are processed by programmable navigation processor 130 at a sufficiently high rate that the angular and velocity changes between successive executions are small. The angular changes are used to update the attitude parameters (the elements of a direction cosine matrix or of a quaternion), and the attitude parameters are used to transform the velocity changes sensed along IMU axes X', Y', Z' into equivalent velocity changes along navigation reference frame axes N 353, E 355 and D 357. These are used to update the reference-frame velocities, which are then integrated to compute location changes. These are used to update the location of inertial navigation unit 100, and since inertial navigation unit 100 is fixed to the host vehicle 343, the location of the host vehicle 343 is also updated.

In this exemplary implementation of this embodiment, the gyros and accelerometers are single-degree-of-freedom devices; each makes its measurements with respect to a single input axis. In other implementations of such an embodiment, the gyros and/or accelerometers are multiple-degree-of-freedom devices that make measurements with respect to more than one input axis.

In one implementation of this embodiment, the gyros are ring laser gyros and the accelerometers are pulse-rebalance accelerometers. In other implementations of such an embodiment, the gyros may be of different types such as mechanical rate gyros, fiber-optic gyros, vibrating reed gyros, or other types, and the accelerometers may be of different types such as vibrating beam, vibrating reed, or other types.

In another implementation of this embodiment, the attitude parameters are the elements of a quaternion that represent the attitude of the IMU axes X', Y', Z' with respect to the navigation reference frame 351. A quaternion represents the attitude of one three-dimensional reference frame with respect to another, in the form of four attitude parameters that are functions of the direction of the single axis about which one frame could be rotated to coincide with the other, and the associated rotation angle. In another implementation of this embodiment, the attitude parameters are the elements of a direction cosine matrix that represents the attitude of the IMU axes X', Y', Z' with respect to the navigation reference frame 351. A direction cosine matrix is a 3×3 array of numbers that represents the attitude of one three-dimensional reference frame with respect to another, and facilitates the conversion of vector components with respect to one frame into the equivalent components with respect to the other frame.

In one implementation of this embodiment, one or more of the sensors 140 includes a processor (not shown) which executes software (not shown) to pre-process and/or prefilter (as it is know in the art) the raw sensor data to convert it to a form suitable for input to programmable navigation processor 130. In another implementation of this embodiment, input preprocessor and/or measurement prefilter functions are implemented as a part of the real-time navigation software 126 executed by the programmable navigation processor 130.

As shown in FIG. 2, a user interface 200 is communicatively coupled to the programmable navigation processor 130. Signals or data are communicated between the user interface 200 and the programmable navigation processor 130 via connections such as an RS422, 1553 or other electrical data bus, an Aeronautical Radio Incorporated (ARINC) data bus, a fiber optic data bus or a radio link. Other corrections are possible. The user interface 200 may be a host vehicle computer, or a keyboard, mode switch or similar device on a user console or on a hand-held device. Data supplied through the user interface 200 and used for inertial navigation system alignment or used to control inertial navigation system alignment constitute "input data." In some implementations, a user may input mode commands that cause the programmable navigation processor 130 to use stored default values as aiding data. Such data also constitute "input data" as used herein.

The software code 120 comprises appropriate program instructions that, when executed by the programmable navigation processor 130, cause the programmable navigation processor 130 to perform the processing described here as being carried out by the software 120. Such program instructions are stored on or otherwise embodied on one or more items of memory 110, only one of which is shown in FIG. 2. As used here, the memory 110 is a storage medium. In one implementation of this embodiment, the memory 110 is integral to an extended storage medium.

The software 120 comprises various elements of software, each including the computer code, variable storage, control logic, and software interfaces that allow the element to interact with other elements and with external interfaces. FIG. 2 shows the four elements of software critical to this invention disclosure; they are real-time navigation software (SW) 126, real-time Kalman filter software (SW) 124, playback navigation software (SW) 128 and playback Kalman filter software (SW) 122. For brevity, real-time navigation software 126, real-time Kalman filter software 124, playback navigation software 128 and playback Kalman filter software 122 are respectively referred to here as real-time navigation 126, real-time Kalman filter 124, playback navigation 128 and playback Kalman filter 122.

The programmable navigation processor 130 executes these software elements at various rates. Real-time navigation 126 is executed at a first tasking rate 114. The first tasking rate 114 is sufficiently fast (typically 50 Hz to 600 Hz) that the navigation errors caused by processing of the inertial sensor data at a finite rate (rather than infinitely fast) are negligible. The real-time Kalman filter software 124 takes much longer to execute and is executed at the slower second tasking rate 112 (typically 0.1 to 10 Hz). Executions of playback navigation 128 and playback Kalman filter 122 are initiated by second tasking rate 112 as described below with reference to method 300 of FIG. 3B.

The programmable navigation processor 130 gives priority to software executed at the first tasking rate 114. The execution of real-time navigation 126 can and often does interrupt the execution of the real-time Kalman Filter Software 124. The programmable navigation processor 130 and its executive software are designed to generate such priority interrupts, and, once the interrupt has been serviced, to resume processing of the interrupted software without adverse effect.

Real-time navigation 126 generates a navigation solution consisting of the values for a set of variables of interest (for example, vehicle latitude, longitude, altitude, north, east and down velocities, and attitude in the form of a quaternion), based in part on the input data. Real-time navigation 126 also implements a feedback control used to correct the navigation solution with inputs from the real-time Kalman filter 124. Real-time navigation 126 also accumulates certain integrals of its navigation solution that are needed in the next execution of the real-time Kalman filter 124. Real-time navigation 126 also sends the navigation solution to the user interface 200, along with other data indicative of the accuracy of the solution and the results of built-in tests. In addition, real-time navigation 126 saves the real-time inertial measurement input data received from the inertial sensors 142 in buffer 117 along with the time at which such data was sensed.

Buffer 117 comprises any suitable form of volatile memory and/or non-volatile memory. In one implementation, buffer 117 is a portion of the same memory that contains the executable software instructions. In other implementations it is a separate external memory. The buffered (saved) inertial measurement input data is used by the playback process during an alignment of the inertial navigation unit 100 described below with reference to FIGS. 3A, 3B, 4 and 6.

In one implementation of this embodiment, the real-time Kalman filter operates to provide a coarse alignment in the form of a direction cosine matrix representing the rotation of the three-axis IMU frame with respect to a three-axis local-level navigation frame, and then converts this to an equivalent attitude quaternion.

In another implementation of this embodiment, three or fewer components of velocity with respect to a known earth location are nominally zero, and the strapdown alignment process is a ground gyrocompass alignment process. In yet another implementation of this embodiment, three or fewer velocity components at an unknown earth location are nominally zero, and the strapdown alignment process is a zero-velocity-reset (ZUPT) alignment process. In yet another implementation of this embodiment, the earth location at a known time is supplied by the GPS receiver 144. In yet another implementation of this embodiment, one or more pseudo-ranges and/or range rates of individual GPS satellites are supplied at a known time by the GPS receiver 144. In yet another implementation of this embodiment, one or more earth-relative velocity components at a known time are supplied by Doppler radar. In another implementation of this embodiment, one or more earth location coordinates (for example latitude, longitude and altitude), earth-relative velocity components and/or earth-relative attitude at a known time are supplied by a navigation system in the host vehicle 343. In yet another implementation of this embodiment, one or more earth location coordinates and/or earth-relative velocity components at a known time are supplied through manual entry by a user. In yet another implementation of this embodiment, altitude at a known time is supplied by a barometric altimeter or another type of altimeter. In another implementation of this embodiment, an angular measurement indicative of system attitude is provided by one or more sun sensors, star sensors, earth sensors, theodolites, by optical or radio interferometers, including multiple GPS antennas, or by other optical sensors.

Figure 3A:
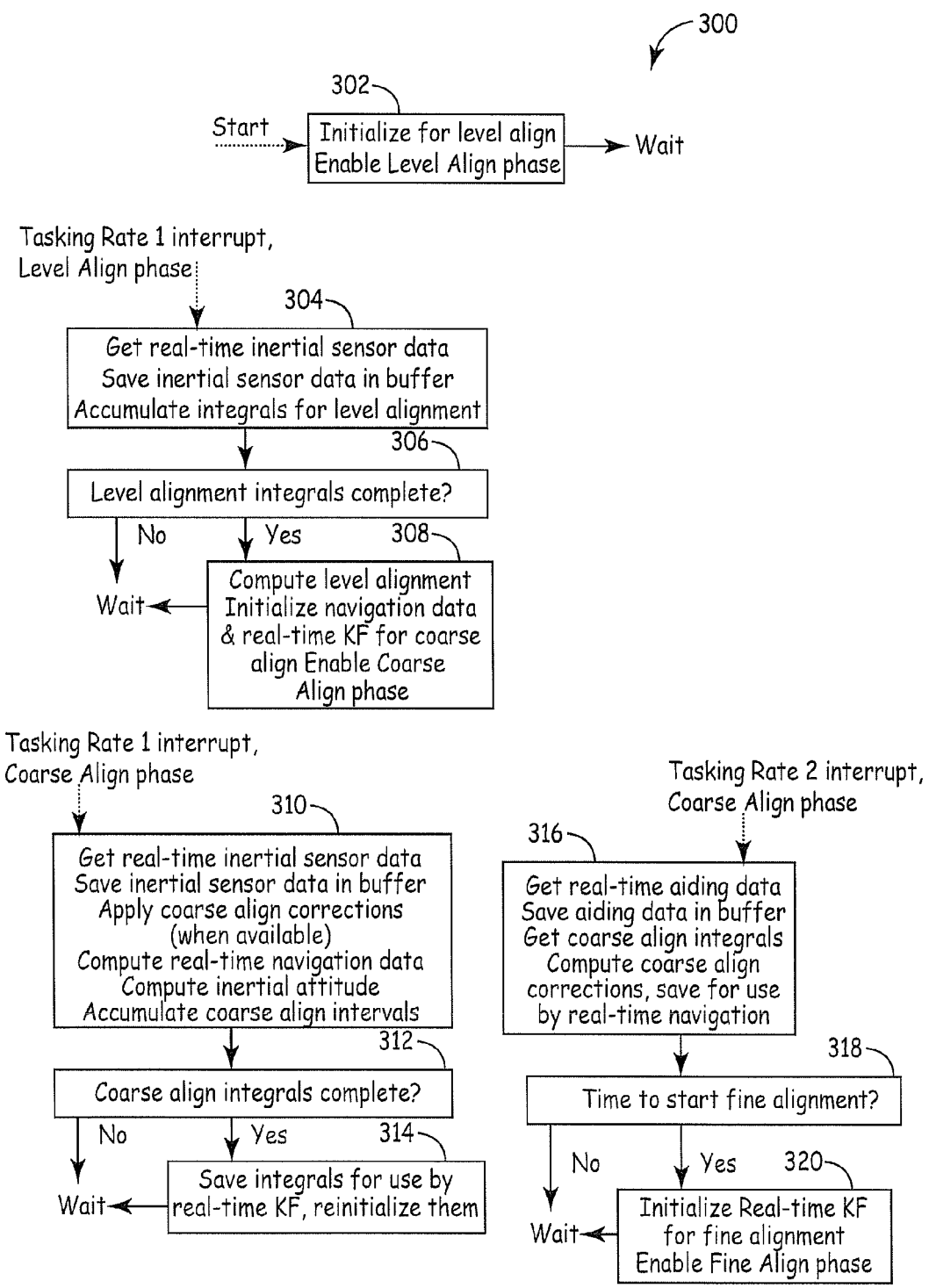
FIGS. 3A and 3B are flow diagrams of one embodiment of a method of aligning a strapdown inertial system.
Figure 3B:
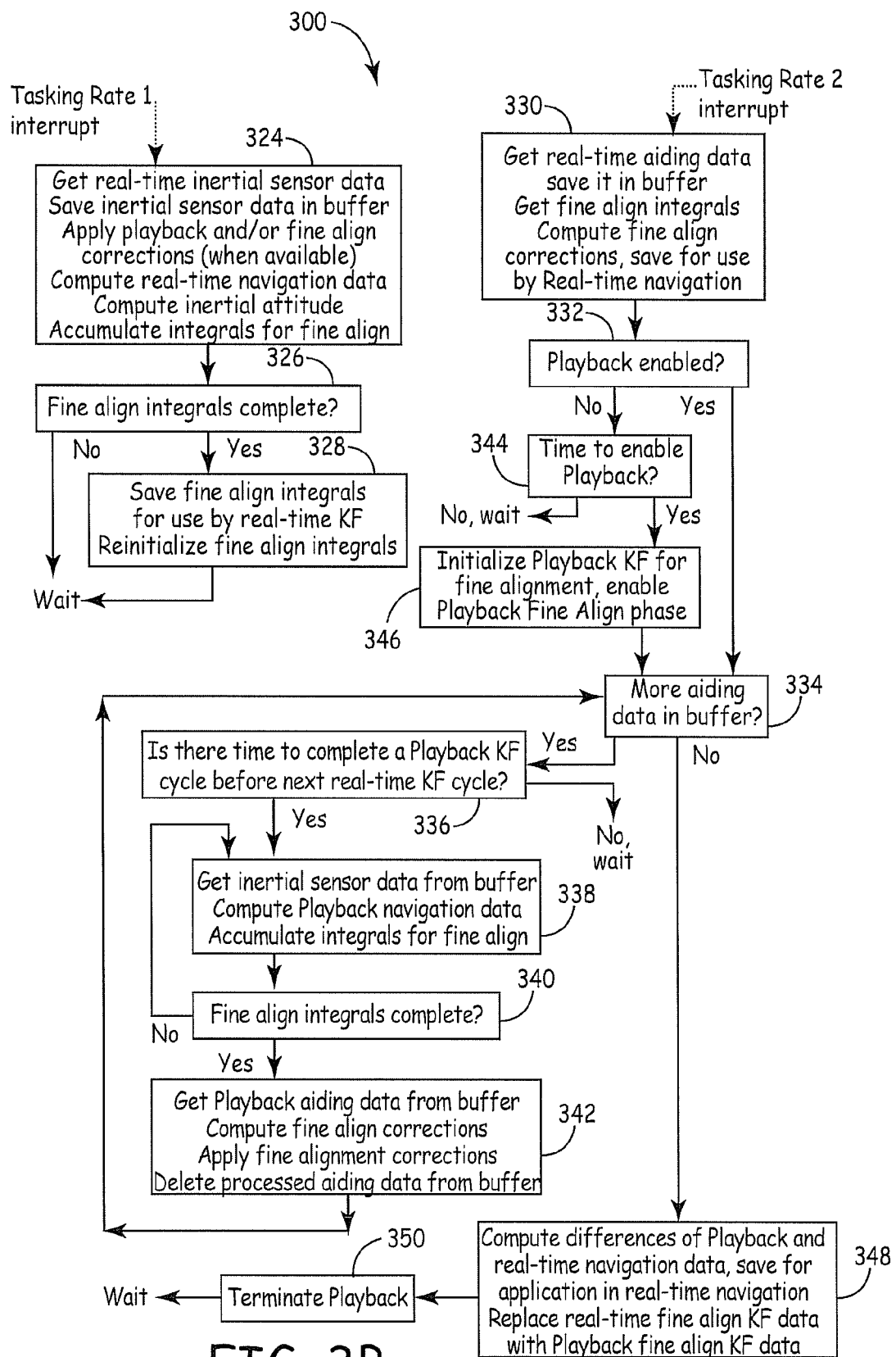

FIGS. 3A and 3B are flow diagrams of one embodiment of a method 300 of aligning a strapdown inertial system such as inertial navigation unit 100. FIG. 3A shows the timing of the real-time computations during the level and coarse align phases of method 300. FIG. 3B shows the timing of real-time computations and playback computations during the fine align phase of method 300. Real-time navigation 126 executes at the first tasking rate 114 and real-time Kalman filter 124 executes at the second tasking rate 112 of the programmable navigation processor 130. Once every real-time Kalman filter cycle, the real-time Kalman filter 124 uses the real-time navigation solution, the accumulated integrals saved for it by real-time navigation 126 and the real-time observation data available from the user or from sensors 140 as input to generate estimates of the errors in the real-time navigation solution. In one implementation of this embodiment, the alignment process for the inertial navigation unit 100 is a ground gyrocompassing alignment process.

Real-time observation data from one or more GPS receivers 144 and other aiding sensors 146 may include, but is not limited to, any of the following:

User's entry of an initial location and selection of an operating mode that treats the host vehicle as nominally at rest with respect to earth;

User's selection of an operating mode that treats the host vehicle as nominally at rest with respect to earth whenever a button is pressed or a switch or the like is activated (so-called "ZUPT" observations);

Earth-relative location and the associated time as supplied by a GPS receiver;

Pseudo-range to an individual GPS satellite, and/or range rate, and the associated time as supplied by a GPS receiver;

Earth-relative velocity components and the associated time as supplied by Doppler radar;

Earth-relative location, velocity components and/or attitude and the associated time as supplied by a host vehicle's navigation system;

Earth-relative location and/or velocity components and the associated time as supplied through manual entry by a user;

Altitude and the associated time as supplied by a barometric altimeter or another type of altimeter; and Angular measurements indicative of system attitude, as provided by one or more sun sensors, star sensors, earth sensors, theodolites, or other optical sensors; or by optical or radio interferometers, including multiple GPS antennas; and the associated times.

The observation data used by the real-time Kalman filter 124 is saved in the buffer 117, along with the time at which such data was sensed.

Even in applications in which the host vehicle 343 is nominally stationary, the vehicle 343 may experience some small motion. For example, an aircraft on the ground buffeted by wind gusts before takeoff moves slightly in response to the wind. For such applications both the real-time Kalman filter 124 and the playback Kalman filter 122 must use observation noise values that allow for such motion. Since the actual noise in observations yet to be taken is unknown, the observation noise values in the real-time Kalman filter are default values that must allow for the worst-case dynamic environment given in the performance specifications for the inertial navigation system. But on most occasions the actual dynamic environment is likely to be much less severe than this worst-case specification. In one implementation of this embodiment, the squares of the per-axis velocities calculated by real-time navigation 126 up to the time at which playback is enabled are summed and the sum is compared with the default variance of velocity observation noise. Whichever is smaller is used as the velocity observation noise variance in the playback Kalman filter 122. Under benign dynamic environments (which are the ones experienced most often) the resulting low noise value allows the playback Kalman filter 122 to ascribe more weight to the difference between the predicted and measured observation, which improves the playback alignment accuracy. In other implementations, this concept is expanded to include the adjustment of other statistics used in the playback Kalman filter.

The error-corrections to the real-time navigation solution computed by real-time Kalman filter 124 are valid for the time at the beginning of the current cycle of the second tasking rate, but it takes time to compute them, and by the time they are available, real-time navigation 126 has already executed a number of times since the error-corrections should have been applied. The real-time computations cope with this with a feed-forward procedure. First, real-time Kalman filter 124 saves the error-corrections for real-time navigation 126 to incorporate when the next cycle of first tasking rate 112 begins. Also, over the current cycle of second tasking rate 112, real-time navigation 126 computes the state transition matrix that transforms errors at the beginning of the cycle into the equivalent errors at the end of the cycle. On the next real-time Kalman filter cycle, the past cycle's error-corrections and the state transition matrix are used to compute the error-corrections that should have been fed forward. The (small) differences between the error-corrections that should have been incorporated and those that were incorporated are error-corrections yet to be accounted for. But like the error-corrections themselves, these error-correction differences are available only after the time at which they should have been incorporated, so they are added to the new navigation corrections computed by real-time Kalman filter 124 and the stuns are fed forward as just described. This feed-forward method is repeated each time real-time Kalman filter 124 is executed. In this manner, the computational latency of the error correction differences is overcome by deferring their application until the next Kalman filter cycle, and compensating for the resulting errors on the cycle that follows.

The coarse align phase of method 300 as shown in FIG. 3A is now described to clarify the coarse alignment process. At block 302, the inertial navigation unit 100 initializes the level alignment to enable the level align phase. This step is executed one time at power-up of the host vehicle 343. At block 304, the inertial navigation unit 100 collects leveling data. The inertial navigation unit 100 receives real-time inertial sensor data, saves the inertial sensor data in the buffer 117, and accumulates integrals for level alignment. Once the inertial navigation unit 100 determines the level alignment integrals are completed (block 306), the inertial navigation unit 100 computes the level alignment and initializes the navigation data and real-time Kalman filter 124 for coarse alignment (block 308). It then enables the coarse align phase by setting software flow control to cause subsequent first tasking rate interrupts to execute block 310 and subsequent second tasking rate interrupts to execute block 316. Then the inertial navigation unit 100 waits to receive interrupts at either the first or second tasking rate.

Subsequently, when a first tasking rate interrupt is received, the flow proceeds to block 310. At block 310, the real-time navigation software 126 receives real-time inertial sensor data. The received real-time inertial sensor data is stored in the buffer 117 and the real-time navigation software 126 applies coarse align error-corrections when they are available. Then the real-time navigation software 126 computes the real-time navigation data, computes the inertial attitude and accumulates the coarse align integrals. At block 312, the inertial navigation unit 100 determines whether the coarse align integrals are complete. If the coarse align integrals are not complete, the inertial navigation unit 100 waits for the next interrupt.

If block 312 finds the coarse align integrals to be complete, the flow proceeds block 314. At block 314 the real-time navigation software 126 saves the coarse align integrals for use by the real-time Kalman filter 124, and reinitializes to begin accumulating new coarse align integrals. Then the inertial navigation unit 100 waits for the next interrupt.

When a second tasking rate interrupt is received, the flow proceeds to block 316. At block 316, the real-time Kalman filter 124 receives real-time aiding data from the GPS receivers 144 and the other aiding sensors 146. The real-time aiding data is stored in the buffer 117. Then the real-time Kalman filter 124 gets the coarse align integrals saved by real-time navigation 126 at block 314. The real-time Kalman filter 124 computes coarse align error-corrections and saves the coarse align error-corrections for use by the real-time navigation 126. At block 318, the inertial navigation unit 100 determines whether it is time to start fine alignment. If not, the real-time Kalman filter 124 waits for the next first or second tasking rate interrupt.

If block 318 determines that it is time to start fine alignment, the flow proceeds to block 320. At block 320, the inertial navigation unit 100 initializes the real-time Kalman filter 124 for fine alignment, and enables the fine align phase, by setting software flow control to cause subsequent first tasking rate interrupts to execute block 324 of FIG. 3B and subsequent second tasking rate interrupts to execute block 330 of FIG. 3B. Then the real-time Kalman filter 124 waits for the next first or second tasking rate interrupt.

An embodiment of the fine align phase of method 300 as shown in FIG. 3B is now described in order to outline the flow of one embodiment of the fine alignment process which includes the playback process. When a first tasking rate interrupt is received, the real-time navigation 126 executes block 324. At block 324, the real-time navigation 126 gets the real-time inertial sensor data, saves the inertial sensor data in the buffer 117 and applies the playback and/or fine align error-corrections when error-corrections are available as described above with reference to block 310 in FIG. 3A. The real-time navigation 126 also computes the real-time navigation data, computes the inertial attitude and accumulates integrals for fine align in the manner described above with reference to block 310 in FIG. 3A. The flow then proceeds to block 326.

At block 326, the inertial navigation unit 100 determines whether the fine align integrals are complete. If not, the inertial navigation unit 100 waits for the next interrupt.

If the fine align integrals are complete, the flow proceeds to block 328. At block 328, the real-time navigation 126 saves and reinitializes the fine align integrals for use by the real-time Kalman filter 124; then the inertial navigation unit 100 waits for the next interrupt.

When a second tasking rate interrupt is received, the flow proceeds to block 330. At block 330, the real-time Kalman filter 124 receives real-time aiding data from the GPS receivers 144 and the other aiding sensors 146. The real-time aiding data is stored in the buffer 117. Then the real-time Kalman filter 124 gets the fine align integrals saved by real-time navigation 126 at block 328. The real-time Kalman filter 124 computes fine align error-corrections and saves the fine align error-corrections for use by the real-time navigation 126.

At block 332, the inertial navigation unit 100 determines whether playback is enabled in the inertial navigation unit 100. Playback navigation 128 is inhibited from execution until the playback navigation 128 is initialized with a playback initial attitude estimate that is estimated from the real-time alignment process (block 346 of FIG. 3B). During the initialization of the playback navigation 128, the inertial navigation unit 100 provides playback navigation 128 with an approximate initial attitude, typically one in which heading is accurate to within a few degrees. This is typically at or after completion of coarse alignment. FIG. 3B illustrates one implementation of a method of the playback process.

In one implementation of this embodiment, the playback process starts by implementing playback navigation 128 after a selected time (for example, 110 seconds) from the start of coarse alignment. After the selected time, the software 120 causes the programmable navigation processor 130 to initiate operation of the playback Kalman filter software 122 at a rate faster than the second tasking rate. In another implementation of this embodiment, the playback process starts by implementing playback navigation 128 when the variances of attitude error, as calculated by real-time Kalman filter 124, drops below pre-selected limits.

The playback navigation 128 begins the playback process by processing the earliest recorded data that was stored as buffered input data within the buffer 117. The playback navigation 128 is initialized with the attitude that the IMU 142 had at the time the attitude data was recorded at the start of the coarse alignment process. If any rotations have occurred since the start of the coarse alignment process, the recorded data is different from the current real-time attitude data available from real-time navigation 126.

In one implementation of this embodiment, real-time navigation 126 performs, as an on-going task in parallel with its navigation computations, a separate integration of attitude, using only sensed inertial rates (transport rates and earth rate used in the navigation algorithm are omitted). When playback processing starts, the computed attitude change with respect to an inertial frame is adjusted for the rotation of the earth and for any location change during the time since data recording began. This adjusted attitude change is then combined with the current real-time attitude data to solve for an estimate of the attitude when data was first recorded. The result is used to initialize the attitude for playback.

In another implementation of this embodiment, the attitude when data was first recorded is calculated as just described, but the heading adjustment is the only result used to initialize playback navigation 128. In this case, the playback alignment sequence performs its own leveling.

In yet another implementation of this embodiment, when the circumstances of the alignment assures that no motion with respect to earth has taken place during the alignment procedure, playback navigation 128 is initialized with the real-time attitude for the time when playback is enabled.

Playback Kalman filter 122 must be initialized with attitude covariance values appropriate for the uncertainty in the attitude estimate used to initialize playback navigation 128. In one implementation of this embodiment, the attitude covariance is the same as the default covariance used to initialize real-time fine alignment. In another implementation of this embodiment, real-time processing executes fine alignment for a period before playback is started and a smaller default covariance is used. In yet another implementation of this embodiment, the covariance is computed in a fashion similar to the propagation of the current estimate of attitude back to the time at which alignment began, as described earlier.

Once started, playback navigation 128 performs essentially the same navigation computations as real-time navigation 126 does for fine alignment, however, the playback navigation 128 operates on buffered inertial data, rather than on the real-time inertial data. Playback navigation 128 also implements a feedback control used to correct the playback navigation solution with inputs from the playback Kalman filter 122. The error estimates are input to the programmable navigation processor 130 as corrective feedback.

Playback Kalman filter 122 performs essentially the same computations as real-time Kalman filter 124, but uses as input the latest playback navigation solution, integrals accumulated by playback navigation 128, and the buffered observation data recorded in the buffer 117 to generate error-corrections to the playback navigation solution.

There is another difference between playback processing and real-time alignment processing. Since the playback Kalman filter 122 begins the fine alignment processing with small attitude errors, the playback Kalman filter 122 dispenses with leveling and coarse alignment. Playback Kalman filter 122 processes the buffered inertial and observation data as inputs to its fine align algorithm, regardless of whether the real-time computations used those data for leveling or for coarse alignment.

Executions of playback navigation 128 and playback Kalman filter 122 are initiated by second tasking rate 112, but their actual rates are faster because both are executed multiple times each time second tasking rate 112 computations are called. As an example, suppose first tasking rate 114 is 50 Hz and second tasking rate 112 is 1 Hz. The timing at second tasking rate 112 is as follows: real-time Kalman filter 124 is executed once; then playback navigation 128 is executed 50 times operating on the buffered inertial data; then playback Kalman filter 122 is executed once to generate error-corrections to the playback navigation 128; then playback navigation 128 is again executed 50 times operating on the buffered inertial data; then playback Kalman filter 122 is executed once, and so on. The playback navigation 128 and playback Kalman filter 122 computations follow this pattern until there is insufficient time for the next playback cycle to be completed before the next execution of real-time Kalman filter 124. All the while, real-time navigation 126 continues, interrupting these second-tasking-rate computations 112 as needed to execute at first tasking rate 114, and continuing to save new inertial sensor data in the buffer 117. This timing is illustrated in FIG. 3B.

If playback is enabled, the flow proceeds to block 334. At block 334, the inertial navigation unit 100 determines whether more aiding data is in the buffer 117. If more aiding data is in the buffer 117, the flow proceeds to block 336. At block 336, the inertial navigation unit 100 determines whether there is time to complete a playback Kalman filter cycle before the next real-time Kalman filter cycle. If the inertial navigation unit 100 determines at block 336 that there is not enough time to complete the playback Kalman filter cycle before the next real-time Kalman filter cycle, the inertial navigation unit 100 waits for the next interrupt.

If the inertial navigation unit 100 determines at block 336 that there is enough time to complete the playback Kalman filter cycle before the next real-time Kalman filter cycle, the flow proceeds to block 338. Although part of the second tasking rate computations, block 338 is executed asynchronously at processor speed. At block 338 the playback navigation 128 gets inertial data from the buffer 117, computes the playback navigation data and accumulates integrals for playback fine align. Then the flow proceeds to block 340, where the inertial navigation unit 100 determines whether the playback fine align integrals are complete.

If the playback fine align integrals are not complete, the flow proceeds back to block 338 and the playback process continues to be implemented by the playback navigation 128.

If it is determined at block 340 that the playback fine align integrals are complete, the flow proceeds to block 342. At block 342, the playback Kalman filter 122 gets the aiding data from the buffer 117, computes the playback fine align error-corrections, applies the playback fine align error-corrections to the playback navigation data, and deletes the processed aiding data from the buffer 117. Then the flow proceeds back to block 334 for implementation as described above.

If at block 332 the inertial navigation unit 100 determines that playback is not enabled in the inertial navigation unit 100, the flow proceeds to block 344 rather than block 334. At block 344, the inertial navigation unit 100 determines whether it is time to enable playback. If it is not time to enable playback, the inertial navigation unit 100 waits for the next interrupt. If it is time to enable playback, the flow proceeds to block 346. At block 346, the inertial navigation unit 100 initializes the playback Kalman filter 122 for fine alignment to enable the playback fine align phase of the alignment process. During initialization of the playback Kalman filter 122 with an initial attitude estimate, an attitude quaternion, a direction cosine matrix or both the attitude quaternion and the direction cosine matrix are propagated back in time to the start of the gyro-compass alignment process. The attitude quaternion, the direction cosine matrix, or the attitude quaternion and the direction cosine matrix are developed by the real-time alignment computations. Then the flow proceeds to block 334.

As described above, at block 334 the inertial navigation unit 100 determines if more aiding data is in the buffer 117. If more aiding data is not in the buffer 117, the flow proceeds to block 348. At block 348, the inertial navigation unit 100 finalizes the playback process. Specifically, a playback correction algorithm (not shown) in the inertial navigation unit 100 computes the error-correction differences of the playback and real-time navigation data, saves the computed error-correction differences for application in the real-time navigation 126, and replaces the real-time fine align Kalman filter data with the playback fine align Kalman filter data. In this manner, the playback correction algorithm replaces the values of real-time Kalman filter software states and covariances with values of the playback Kalman filter software states and covariances.

In one implementation of this embodiment, the selected time (at which block 346 was implemented) is a first selected time, after which the software 120 causes the programmable navigation processor 130 to initiate operation of the playback Kalman filter software 122 at a rate faster than the second tasking rate. In this case, the time at which block 348 is implemented is a second selected time. After the second selected time, the navigation solution calculated by the real-time navigation software 126 is replaced by the navigation solution calculated by the playback navigation software 128, and the real-time Kalman filter software variables are replaced by the playback Kalman filter software variables. In one implementation of this embodiment, the second selected time occurs when the buffered input data just processed by the playback Kalman filter software 122 is the same as the real-time input data just processed by the real-time Kalman filter software 124 (this is the implementation shown in FIG. 3B).

At block 350, the playback is disabled in the inertial navigation unit 100 and the inertial navigation unit 100 waits for further interrupts. Subsequent interrupts will execute only the real-time navigation 126 and the real-time Kalman filter 124. Two implementations of embodiments of blocks 348 and 350 are described below with reference to methods 500 and 600 of FIGS. 5 and 6, respectively.

In order to implement method 300, playback navigation 128 and playback Kalman filter 122 are both iterated at rates faster than their real-time counterparts real-time navigation 126 and real-time Kalman filter 124. In one embodiment playback navigation 128 and playback Kalman filter 122 are both executed twice for each execution of the corresponding real-time algorithms. The programmable navigation processor 130 has the computational capacity to execute the pattern of playback navigation 128 and playback Kalman filter 122 computations at a faster effective rate than the rate at which real-time navigation 126 and real-time Kalman filter 124 execute. This is possible not only because of the processor's high computational capacity, but also because playback navigation 128 and playback Kalman filter 122 operate on data saved in the buffer 117, which data is always immediately available, whereas the real-time navigation 126 and real-time Kalman filter 124 are limited to the rate at which the inertial sensors 142 supply new data. In addition, the playback navigation 128 and playback Kalman filter 122 execute computations faster than their real-time counterparts, real-time navigation 126 and real-time Kalman filter 124. This is because the playback navigation 128 and playback Kalman filter 122 omit some functions such as saving data in the buffer 117 and preparing data for output. In one implementation, playback navigation 128 also omits the inertial-only attitude integration performed by real-time navigation 126.

Thus, even as the real-time computations continue to add new data to the buffer 117, the playback computations are processing the buffer's old data faster than the new data is added. Eventually, the playback computations catch up to the real-time computations, in the sense that the only buffered data remaining to be processed by playback Kalman filter 122 is the copy of the current real-time data which real-time navigation 126 has just put into the buffer 117. In an implementation where the actual playback processing rates are twice the real-time processing rates, playback processing catches up to real-time processing after a total time in alignment equal to twice the delay in enabling playback.

Once playback navigation 128 has caught up to real-time navigation 126, that is, when both are now processing only the latest real-time inertial data, their respective navigation solutions can both be considered as real-time solutions. But the navigation solution generated by playback navigation 128 is more accurate than real-time navigation solution, because playback navigation 128 has processed more data with the fine align algorithm. So the playback navigation solution is the one to be sent to the user when the fine alignment is completed.

The termination of the playback process is accomplished in one of two ways. The first process for termination is implemented by replacing the values of the real-time navigation solution variables and real-time Kalman filter variables with the corresponding playback navigation solution variables and playback Kalman filter variables and then discontinuing execution of the playback navigation 128 and playback Kalman filter 122. This process is described in detail with reference to method 500 of FIG. 5.

The second process for termination is implemented by restricting real-time navigation 126 to only the buffering of input data, discontinuing the real-time Kalman filter 124 computations, and supplying the user with the playback navigation solution. This process is described in detail with reference to method 600 of FIG. 6. Method 500 is more complex but it preserves the same output timing as real-time navigation 126 and is preferable for most applications.

In one implementation of this embodiment, the real-time navigation solution transitions into playback navigation solution by forming the differences between the two navigation solutions and combining these differences with the real-time Kalman filter 124 error-corrections. Like the error-corrections generated by the real-time Kalman filter 124, the navigation solution differences are obsolete by the time they are available, so they are incorporated in the feed-forward process described above with reference to FIG. 3A for real-time Kalman filter 124 error-corrections. The transition begins by subtracting the sum of the real-time navigation solution, the error-corrections generated by the real-time Kalman filter 124, and the adjustments fed forward from the previous real-time Kalman filter cycle from the corresponding sum for playback. This difference is processed only once in the same way as described earlier for real-time Kalman filter error-corrections. On succeeding cycles of the real-time Kalman filter 124, the real-time error-corrections and fed-forward adjustments are processed in the usual way. Once the solution difference has been incorporated into the real-time navigation solution, execution of playback navigation 128 and playback Kalman filter 122 is discontinued. In this manner, the statistics of the measurement data are used to refine the statistics used in the playback Kalman filter to achieve improved performance and a faster gyrocompass alignment.

In yet another implementation of this embodiment, the magnitudes of the differences between real-time navigation solutions and playback navigation solutions are tested against pre-selected thresholds. If they exceed their thresholds, the amount of the navigation solution difference incorporated into real-time navigation solution on any single navigation cycle is limited in order to prevent abrupt changes in the navigation solution that is output to the user. The unincorporated portion of the navigation solution difference is fed forward as an adjustment to be incorporated in one or more subsequent cycles. When all of the navigation solution difference has been incorporated into the real-time navigation solution, execution of playback navigation 128 and playback Kalman filter 122 is discontinued.

Figure 4:
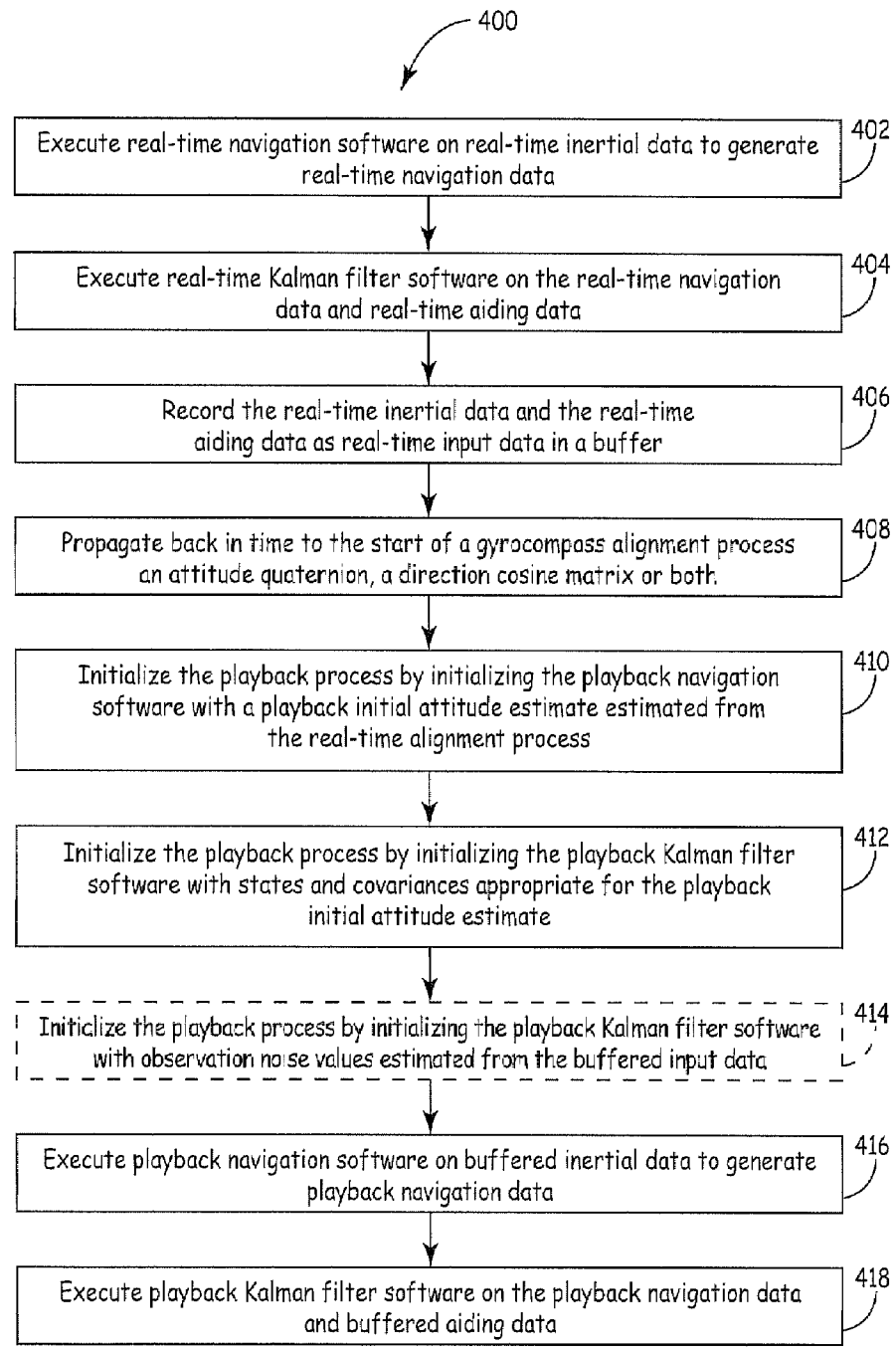
FIG. 4 is a flowchart of one embodiment of a method 400 of aligning a strapdown inertial system.

FIG. 4 is a flowchart of one embodiment of a method 400 of aligning a strapdown inertial system. The method 400 is a high level outline of the method 300 of FIGS. 3A and 3B. The embodiment of method 400 is described as being implemented using the programmable navigation processor 130 and the software code 120 of FIG. 2. The programmable navigation processor 130 executes software and/or firmware that causes the programmable navigation processor 130 to perform at least some of the processing described in method 400 as being performed by the programmable navigation processor 130.

At block 402, the programmable navigation processor 130 executes real-time navigation software 126 on real-time inertial data to generate real-time navigation data. The real-time inertial data is input to the programmable navigation processor 130 from the IMU 142. At block 404, the programmable navigation processor 130 executes real-time Kalman filter software 124 on the real-time navigation data and real-time aiding data. The real-time navigation 126 generates the real-time navigation data and inputs it to the real-time Kalman filter software 124. The programmable navigation processor 130 receives the real-time aiding data from the GPS receiver 144 and/or the other aiding sensors 146. The execution of the real-time navigation software 126 at block 402 and execution of the real-time Kalman filter software 124 effect a real-time alignment process.

At block 406, the real-time inertial data and the real-time aiding data is recorded in the sensor data buffer 117 as real-time input data. The buffered input data is used later during the playback process that is implemented during blocks 414-418. The buffered input data includes the buffered inertial data received from the IMU 142 and the buffered observation data received from at least one GPS receiver 144 and/or other aiding sensors 146.

At blocks 408-414, the initialization of the playback process occurs. Blocks 408, 410 and 412 are required initialization stages for the playback process to be implemented. Block 414 is optionally implemented to improve the playback alignment accuracy. At block 408, the programmable navigation processor 130 propagates back in time, to the start of a gyrocompass alignment process, the attitude quaternion the direction cosine matrix or both. The attitude quaternion and/or the direction cosine matrix are developed by the real-time alignment computations which occurred during blocks 402 and 404.

At block 410, the programmable navigation processor 130 initializes the playback process by initializing the playback navigation software 128 with a playback initial attitude estimate that was estimated from the real-time alignment process that occurred during blocks 402-404. At block 412, the programmable navigation processor 130 initializes the playback process by initializing the playback Kalman filter software 122 with states and covariances appropriate for the playback initial attitude estimate. In one implementation of this embodiment at block 414, the programmable navigation processor 130 initializes the playback process by initializing the playback Kalman filter software 122 with observation noise values estimated from the buffered input data.

At block 416, the programmable navigation processor 130 executes playback navigation software 128 on buffered inertial data to generate playback navigation data. At block 418, the programmable navigation processor 130 executes playback Kalman filter software 122 on the buffered aiding data and the playback navigation data received from the playback navigation software 128. The playback navigation software 128 and the playback Kalman filter software 122 effect an alignment process executed at a faster rate than the real-time navigation software 126 and real-time Kalman filter software 124 as described above with reference to method 300 of FIGS. 3A and 3B.

Figure 5:
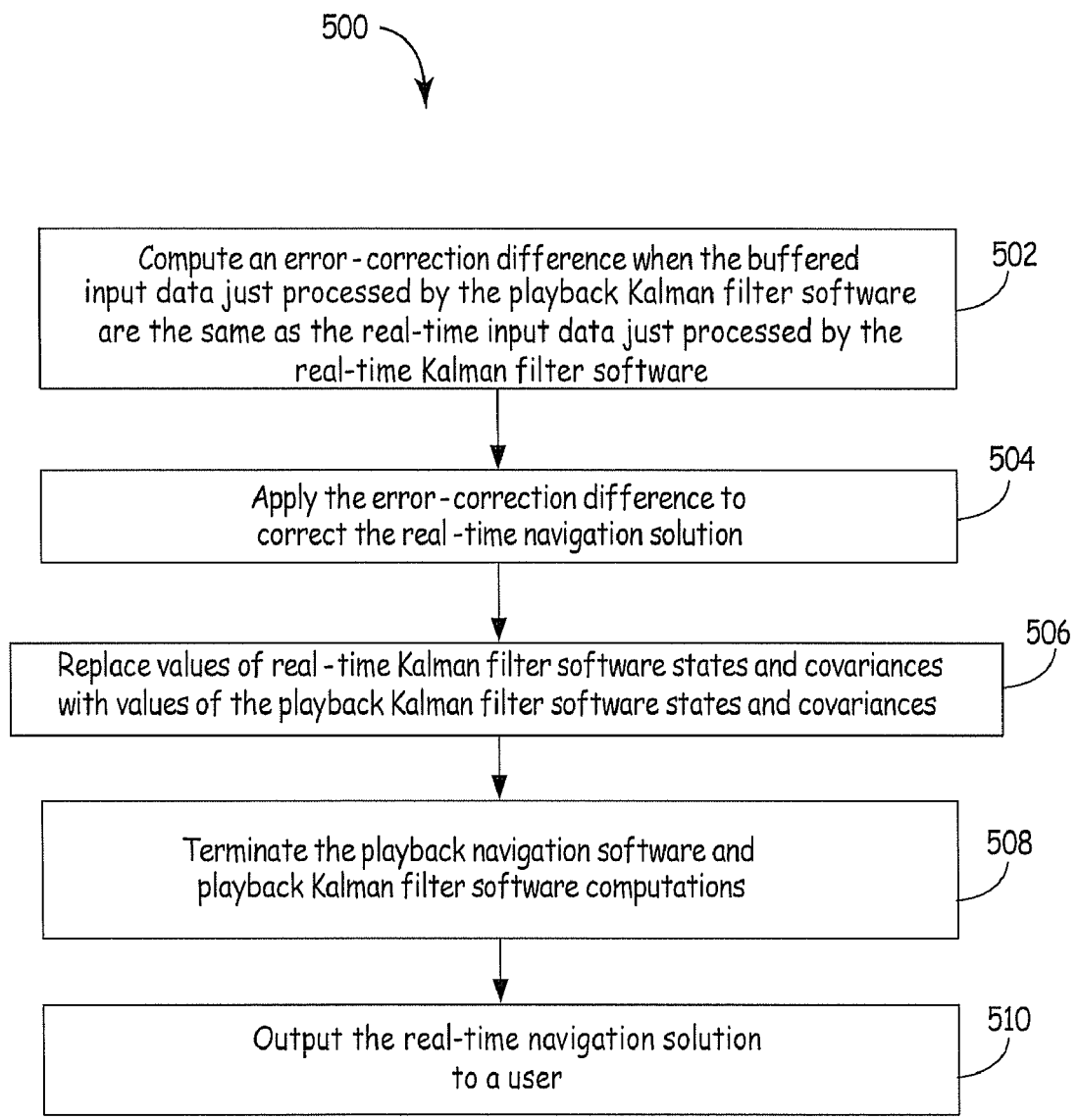
FIG. 5 is a flowchart of one embodiment of a method of finalizing the playback process and terminating the playback process.

FIG. 5 is a flowchart of one embodiment of a method 500 of finalizing the playback process and terminating the playback process. The embodiment of method 500 is described as being implemented using the programmable navigation processor 130 and the software code 120 of FIG. 2. The programmable navigation processor 130 executes software and/or firmware that causes the programmable navigation processor 130 to perform at least some of the processing described in method 500 as being performed by the programmable navigation processor 130. The method 500 is implemented as part of the computations of block 348 of FIG. 3B.

At block 502, the programmable navigation processor 130 computes an error-correction difference when the buffered input data just processed by the playback Kalman filter software 122 are the same as the real-time input data just processed by the real-time Kalman filter software 124. In one implementation of this embodiment, the error-correction difference comprises the sum of a playback navigation solution and a playback Kalman filter software navigation error estimate minus the stun of a real-time navigation solution and a real-time Kalman filter software navigation error estimate. At block 504, the programmable navigation processor 130 applies the error-correction difference to correct the real-time navigation solution that is currently generated by the real-time navigation software 126. At block 506, the programmable navigation processor 130 replaces values of real-time Kalman filter software states and covariances with values of the playback Kalman filter software states and covariances.

At block 508, the programmable navigation processor 130 terminates the playback navigation software 128 and playback Kalman filter software 122 computations. In the implementation of method 500, executions of the real-time navigation software 126 and the real-time Kalman filter 124 continue after playback computations have been terminated. At block 510, the programmable navigation processor 130 outputs the real-time navigation solution to a user.

Figure 6:
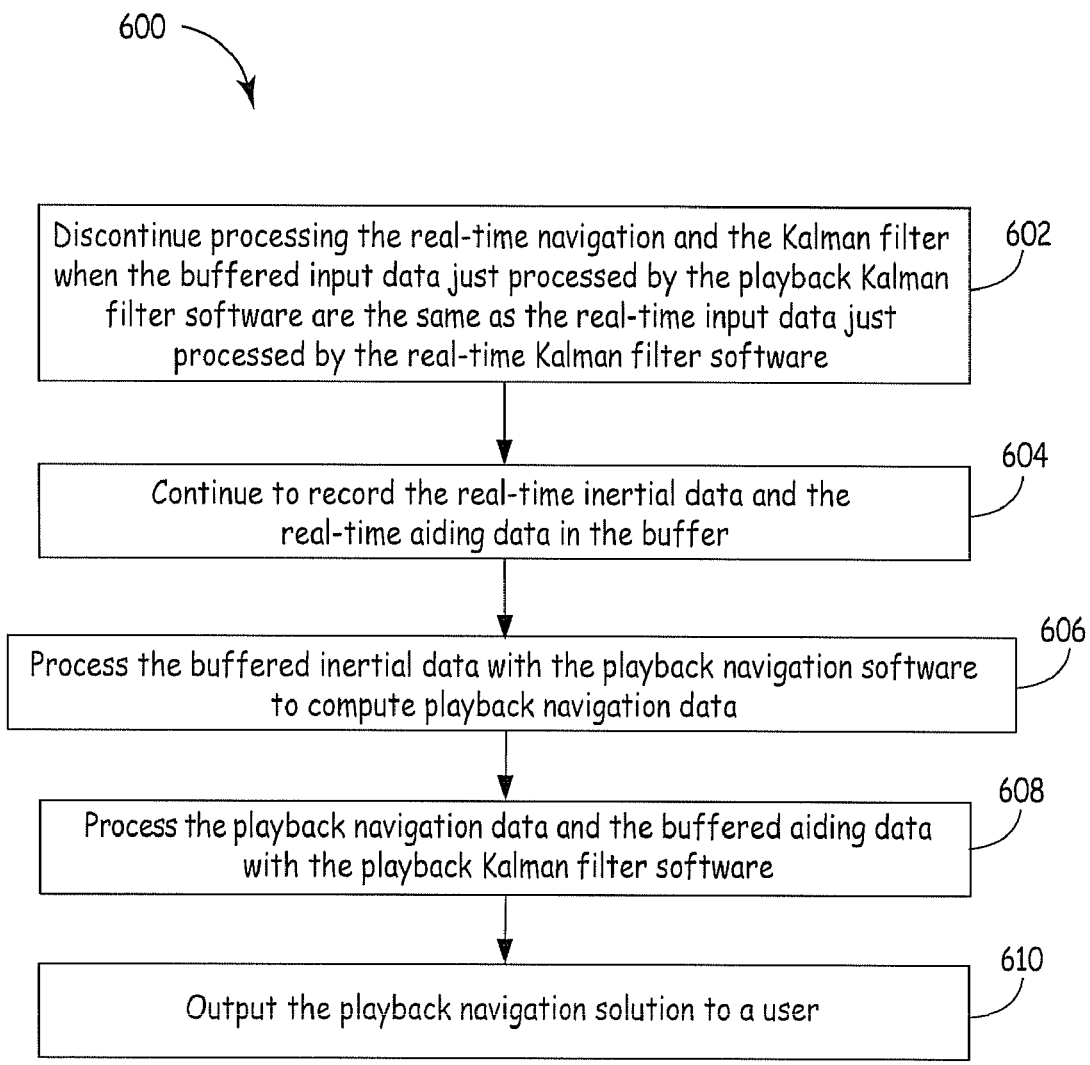
FIG. 6 is a flowchart of one embodiment of a method of finalizing the playback process and terminating the playback process.

FIG. 6 is a flowchart of one embodiment of a method 600 of finalizing the playback process and terminating the playback process. The embodiment of method 600 is described as being implemented using the programmable navigation processor 130 and the software code 120 of FIG. 2. The programmable navigation processor 130 executes software and/or firmware that causes the programmable navigation processor 130 to perform at least some of the processing described in method 600 as being performed by the programmable navigation processor 130. The method 600 is implemented as part of the computations of block 348 of FIG. 3B.

At block 602, the programmable navigation processor 130 discontinues processing of the real-time navigation software 126 and the real-time Kalman filter 124 when the buffered input data just processed by the playback Kalman filter software 122 are the same as the real-time input data just processed by the real-time Kalman filter software 126. At block 604, the programmable navigation processor 130 continues to record the real-time inertial data and the real-time aiding data in the buffer 117. At block 606, the programmable navigation processor 130 processes the buffered inertial data with the playback navigation software 128 to compute playback navigation data. At block 608, the programmable navigation processor 130 processes the playback navigation data and buffered aiding data with the playback Kalman filter software 122. At block 610, the programmable navigation processor 130 outputs the playback navigation solution to a user. In the implementation of method 600, executions of the playback navigation software 128 and the playback Kalman filter 122 continue after real-time computations have been terminated.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium (such as memory 110 shown in FIG. 2) tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor receives instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method comprising:
    executing real-time navigation software on real-time inertial data to generate real-time navigation data;
    executing real-time Kalman filter software on the real-time navigation data and real-time aiding data;
    recording the real-time inertial data and the real-time aiding data as real-time input data in a buffer;
    initializing a playback process;
    executing playback navigation software on buffered inertial data to generate playback navigation data; and
    executing playback Kalman filter software on the playback navigation data and buffered aiding data, wherein the execution of the real-time navigation software and the real-time Kalman filter software effect a real-time alignment process, and wherein the playback navigation software and the playback Kalman filter software effect an alignment process executed at a faster rate than the real-time navigation software and real-time Kalman filter software.

2. The method of claim 1, wherein initializing a playback process comprises:
    initializing the playback navigation software with a playback initial attitude estimate estimated from the real-time alignment process; and
    initializing the playback Kalman filter software with states and covariances appropriate for the playback initial attitude estimate.

3. The method of claim 2, the method further comprising:
    propagating back in time to the start of a gyrocompass alignment process one of: an attitude quaternion; a direction cosine matrix; and the attitude quaternion and the direction cosine matrix, wherein the one of the attitude quaternion, the direction cosine matrix, and the attitude quaternion and the direction cosine matrix are developed by real-time alignment computations.

4. The method of claim 1, the method further comprising:
    computing an error-correction difference when buffered input data processed by the playback Kalman filter software are the same as the real-time input data processed by the real-time Kalman filter software;
    applying the error-correction difference to correct a real-time navigation solution;
    replacing values of real-time Kalman filter software states and covariances with values of the playback Kalman filter software states and covariances;
    terminating the playback navigation software and playback Kalman filter software computations; and
    outputting the real-time navigation solution to a user.

5. The method of claim 4, wherein the error-correction difference comprises the sum of a playback navigation solution and a playback Kalman filter software navigation error estimate minus the sum of the real-time navigation solution and a real-time Kalman filter software navigation error estimate.

6. The method of claim 1, the method further comprising:
    discontinuing processing of the real-time navigation software and the real-time Kalman filter when buffered input data processed by the playback Kalman filter software are the same as the real-time input data processed by the real-time Kalman filter software;

continuing to record the real-time inertial data and the real-time aiding data in the buffer;

processing the buffered inertial data with the playback navigation software to compute playback navigation data;

processing the playback navigation data and the buffered aiding data with the playback Kalman filter software; and outputting the playback navigation solution to a user.

7. The method of claim 1, wherein buffered input data comprises the buffered inertial data and buffered observation data and wherein initializing a playback process comprises:

initializing the playback Kalman filter software with observation noise values estimated from the buffered input data.

8. An inertial navigation unit comprising:

at least one sensor to provide real-time input data;

a programmable navigation processor communicatively coupled to the at least one sensor;

real-time navigation software executable by the programmable navigation processor, the real-time navigation software to generate a real-time navigation solution at a first tasking rate, the generation of the real-time navigation solution based in part on the real-time input data;

real-time Kalman filter software executable by the programmable navigation processor to process the real-time input data at a second tasking rate;

playback navigation software executable by the programmable navigation processor after a selected time to generate a playback navigation solution at a rate faster than the first tasking rate, wherein the generation of the playback navigation solution is based in part on buffered input data; and playback Kalman filter software executable by the programmable navigation processor after the selected time to process the buffered input data at a rate faster than the second tasking rate, wherein the first tasking rate is higher than the second tasking rate.

9. The inertial navigation unit of claim 8, further comprising:

a buffer communicatively coupled to the programmable navigation processor to record the input data input to the programmable navigation processor after a start of an alignment process for the inertial navigation unit.

10. The inertial navigation unit of claim 9, wherein the alignment process for the inertial navigation unit is a ground gyrocompassing alignment process.

11. The inertial navigation unit of claim 8, wherein the at least one sensor comprises:

at least one inertial sensor to provide inertial data; and at least one aiding sensor to provide observation data, wherein the inertial data and the observation data comprise the input data.

12. The inertial navigation unit of claim 11, wherein the at least one aiding sensor comprises a global positioning system receiver.

13. The inertial navigation unit of claim 8, wherein the selected time is a first selected time, wherein the software causes the programmable navigation processor to initiate operation of the playback Kalman filter software at a rate faster than the second tasking rate, and wherein at a second selected time the navigation solution calculated by the real-time navigation software is replaced by the navigation solution calculated by the playback navigation software, and the real-time Kalman filter software variables are replaced by the playback Kalman filter software variables.

14. The inertial navigation unit of claim 13, wherein the second selected time occurs when the buffered input data processed by the playback Kalman filter software is the same as the real-time input data processed by the real-time Kalman filter software.

15. The inertial navigation unit of claim 13, wherein the rate faster than the first tasking rate is twice the first tasking rate, and the rate faster than the second tasking rate is twice the second tasking rate.

16. The inertial navigation unit of claim 8, wherein the real-time Kalman filter software operates to provide a coarse alignment conversion to an attitude quaternion.

17. A program-product comprising program instructions, embodied on a storage medium, that cause a programmable processor to:

execute real-time navigation software on real-time inertial data to generate real-time navigation data;

execute real-time Kalman filter software on the real-time navigation data and real-time aiding data;

record the real-time inertial data and the real-time aiding data as real-time input data in a buffer;

initialize a playback process;

execute playback navigation software on buffered inertial data to generate playback navigation data; and execute playback Kalman filter software on the playback navigation data and buffered aiding data, wherein the execution of the real-time navigation software and the real-time Kalman filter software effect a real-time alignment process, and wherein the playback navigation software and the playback Kalman filter software effect an alignment process executed at a faster rate than the real-time navigation software and real-time Kalman filter software.

18. The program-product of claim 17, further comprising instructions to cause the programmable processor to:

initialize the playback navigation software with a playback initial attitude estimate estimated from the real-time alignment process;

initialize the playback Kalman filter software with states and covariances appropriate for the playback initial attitude estimate; and propagate back in time to the start of a gyrocompass alignment process one of: an attitude quaternion; a direction cosine matrix; and the attitude quaternion and the direction cosine matrix, wherein the one of the attitude quaternion, the direction cosine matrix, and the attitude quaternion and the direction cosine matrix are developed by real-time alignment computations.

19. The program-product of claim 17, further comprising instructions to cause the programmable processor to:

compute an error-correction difference when buffered input data processed by the playback Kalman filter software are the same as the real-time input data processed by the real-time Kalman filter software;

apply the error-correction difference to correct a real-time navigation solution;

replace values of real-time Kalman filter software states and covariances with values of the playback Kalman filter software states and covariances;

terminate the playback navigation software and playback Kalman filter software computations; and output the real-time navigation solution to a user.

20. The program-product of claim 17, further comprising instructions to cause the programmable processor to:

discontinue processing of the real-time navigation software and the real-time Kalman filter when buffered input data processed by the playback Kalman filter software are the same as the real-time input data processed by the real-time Kalman filter software;

continue to record the real-time inertial data and the real-time aiding data in the buffer;

process the buffered inertial data with the playback navigation software to compute playback navigation data;

process the playback navigation data and the buffered aiding data with the playback Kalman filter software; and output the playback navigation solution to a user.

* * * * *